Patented May 10, 1949

2,470,032

UNITED STATES PATENT OFFICE 2,470,032

VAT DYESTUFFS

Robert Norman Heslop, Francis Irving, and Alistair Livingston, Blackley, Manchester, England, assignors to Imperial Chemical Industries Limited, a corporation of Great Britain No Drawing. Application August 14, 1945, Serial No. 610,869. In Great Britain August 15, 1944

1 Claim. (Cl. 260—276)

This invention relates to new vat dyes of the phthaloylacridone series and more particularly it relates to a process for the manufacture of blue or violet vat dyes of excellent light fastness and of good level dyeing properties.

The new dyestuffs are acylated 6-amino-3':4'-phthaloylacridones of the formula

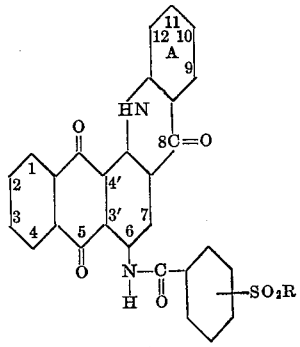

wherein R stands for an alkane, aralkane or benzene radical.

In the specification of our copending application Serial No. 610,868 filed of even date herewith, we have described the preparation of compounds of the above formula wherein the nucleus A carries as substituent an alkanesulphonyl radical.

According to the present invention we provide a process for the manufacture of new vat dyestuffs of the above formula which comprises acylating a 6-amino-3':4'-phthaloylacridone which may carry any substituent other than an alkane-, aralkane- or benzene-sulphonyl radical, with an acylating derivative of an alkane-, aralkane- or benzene-sulphonyl-benzoic acid.

As 6-amino-3':4'-phthaloylacridones which may be acylated according to the process of the invention there are for example 6-amino-3':4'-phthaloylacridone, 9-chloro-6-amino-3':4'-phthaloylacridone, 10:12-dichloro-6-amino-3':4'-phthaloylacridone and 10-methyl-6-amino-3':4'-phthaloylacridone.

As alkane-, aralkane- or benzene-sulphonylbenzoic acids whose acylating derivatives may be used there are for example m-methanesulphonylbenzoic acid, p-methanesulphonylbenzoic acid, p-n-butanesulphonylbenzoic acid, diphenylsulphone-4-carboxylic acid and p-phenylmethanesulphonylbenzoic acid.

The acylation process is carried out by conventional methods. As suitable acylating derivatives of the said acids there are for example the halides. The new dyestuffs so obtained are blue or violet vat dyes of excellent fastness to light and good level dyeing properties.

The invention is illustrated by the following examples in which the parts are by weight:

Example 1

A mixture of 100 parts of m-methanesulphonylbenzoic acid, 1500 parts of nitrobenzene and 150 parts of thionyl chloride is stirred at 100° C. for 3 hours. The excess thionyl chloride is then removed by heating the mixture under a slightly reduced pressure at 140° C. for 30 minutes, and 130 parts of 6-amino-3':4'-phthaloylacridone are then added to the so-obtained m-methanesulphonylbenzoyl chloride together with 1 part of pyridine. The mixture is then stirred at 180–185° C. for 1½ hours and is then cooled and filtered. The residue is washed with benzene and with ethanol and is then dried. There is thus obtained 6-m-methane-sulphonylbenzoylamino-3':4'-phthaloylacridone which dyes cotton from a violet alkaline sodium hydrosulphite vat in blue shades of very good fastness to light. If in the above process p-methane sulphonylbenzoic acid is used in place of the m-methanesulphonylbenzoic acid, a similar dyestuff is obtained which gives slightly greener shades. If instead there is used o-methanesulphonylbenzoic acid the final product dyes cotton in reddish blue shades.

Example 2

A mixture of 70 parts p-n-butanesulphonylbenzoyl chloride, 1000 parts of dry nitrobenzene, 70 parts of 6-amino-3':4'-phthaloylacridone, and 1 part of pyridine is stirred at 160°–165° C. for 3 hours and is then cooled and filtered. The residue is washed with benzene and with ethanol and is then dried. There is thus obtained 6-p-n-butanesulphonylbenzoylamino-3':4'-phthaloylacridone which dyes cotton from a violet alkaline sodium hydrosulphite vat in bright greenish blue shades. If in the above process diphenylsulphone-4-carboxylic acid chloride is used in place of p-n-butanesulphonylbenzoyl chloride, a similar dyestuff is obtained which gives redder shades. If instead there is used p-phenylmethanesulphonylbenzoyl chloride the final product dyes cotton in blue shades.

Example 3

A mixture of 90 parts p-methanesulphonylbenzoyl chloride, 1500 parts dry nitrobenzene, 100 parts 9-chloro-6-amino-3':4'-phthaloylacridone and 1 part of pyridine is stirred at 160–165° C. for 3 hours and is then cooled and the product is isolated as is described in Example 2. There is thus obtained 9-chloro-6-p-methanesulphonyl-benzoylamino-3':4'-phthaloylacridone which dissolves in sulphuric acid to give a reddish coloured solution and which dyes cotton from a red-violet sodium hydrosulphite vat in blue shades. If in the above process 10:12-dichloro-6-amino-3':4'-phthaloylacridone is used in place of 9-chloro-6-amino-3':4'-phthaloylacridone a brownish violet crystalline powder is obtained which dyes cotton in reddish blue shades. If instead there is used 10-methyl-6-amino-3':4'-phthaloylacridone the final dyestuff dyes cotton in blue shades.

We claim:
6 - butanesulphonylbenzoylamino - 3':4'-phthaloylacridone.

ROBERT NORMAN HESLOP.
FRANCIS IRVING.
ALISTAIR LIVINGSTON.

REFERENCES CITED

The following references are of record in the file of this patent:

UNITED STATES PATENTS

| Number | Name | Date |
|---|---|---|
| 1,002,270 | Hessenland | Sept. 5, 1911 |
| 2,005,321 | Kunz et al. | June 18, 1935 |
| 2,133,274 | Dettwyler | Oct. 18, 1938 |